US012036782B2

United States Patent
Kirkpatrick

(10) Patent No.: US 12,036,782 B2
(45) Date of Patent: Jul. 16, 2024

(54) COMPOSITES AND METHODS OF FORMING COMPOSITES HAVING AN INCREASED VOLUME OF CERAMIC PARTICLES

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 332 days.

(21) Appl. No.: 17/242,725

(22) Filed: Apr. 28, 2021

(65) Prior Publication Data

US 2021/0387441 A1 Dec. 16, 2021

Related U.S. Application Data

(60) Provisional application No. 63/039,092, filed on Jun. 15, 2020.

(51) Int. Cl.
*B32B 5/24* (2006.01)
*B29C 70/02* (2006.01)
(Continued)

(52) U.S. Cl.
CPC .............. *B32B 5/24* (2013.01); *B29C 70/025* (2013.01); *B32B 5/02* (2013.01); *B32B 5/16* (2013.01);
(Continued)

(58) Field of Classification Search
CPC ............ B29C 70/025; B32B 2260/023; B32B 2260/025; B32B 2260/04;
(Continued)

(56) References Cited

U.S. PATENT DOCUMENTS 4,599,256 A 7/1986 Vasilos
4,613,522 A 9/1986 Vasilos
(Continued)

FOREIGN PATENT DOCUMENTS

CN 106478125 3/2017
EP 1260729 11/2002
(Continued)

OTHER PUBLICATIONS

European Patent Office, European Search Report dated Oct. 28, 2021 in Application No. 21179302.1.
(Continued)

*Primary Examiner* — Lynda Salvatore
(74) *Attorney, Agent, or Firm* — SNELL & WILMER L.L.P.

(57) ABSTRACT

A fiber reinforced composite component may include interleaved textile layers and ceramic particle layers coated with matrix material. The fiber reinforced composite component may be fabricated by forming a fibrous preform and densifying the fibrous preform. The fibrous preform may be fabricated by forming a first ceramic particle layer over a first textile layer, disposing a second textile layer over the first ceramic particle layer, forming a second ceramic particle layer over the second textile layer, and disposing a third textile layer over the second ceramic particle layer.

11 Claims, 9 Drawing Sheets

(51) Int. Cl.
| | |
|---|---|
| *B29K 307/04* | (2006.01) |
| *B29K 509/04* | (2006.01) |
| *B32B 5/02* | (2006.01) |
| *B32B 5/16* | (2006.01) |
| *B32B 5/30* | (2006.01) |
| *B32B 37/24* | (2006.01) |
| *C04B 35/628* | (2006.01) |
| *C04B 35/83* | (2006.01) |

(52) U.S. Cl.
CPC ............... *B32B 5/30* (2013.01); *B32B 37/24* (2013.01); *C04B 35/6286* (2013.01); *C04B 35/62878* (2013.01); *C04B 35/62892* (2013.01); *C04B 35/62894* (2013.01); *C04B 35/83* (2013.01); *B29K 2307/04* (2013.01); *B29K 2509/04* (2013.01); *B32B 2260/023* (2013.01); *B32B 2260/025* (2013.01); *B32B 2260/04* (2013.01); *B32B 2262/106* (2013.01); *B32B 2264/107* (2013.01); *B32B 2313/04* (2013.01); *B32B 2315/02* (2013.01); *B32B 2605/18* (2013.01); *C04B 2235/3821* (2013.01); *C04B 2235/422* (2013.01); *C04B 2235/428* (2013.01); *C04B 2235/5248* (2013.01); *C04B 2235/5256* (2013.01); *C04B 2235/616* (2013.01)

(58) Field of Classification Search
CPC ........ B32B 2262/106; B32B 2264/107; B32B 2313/04; B32B 2315/02; B32B 2605/18; B32B 37/24; B32B 5/02; B32B 5/16; B32B 5/24; B32B 5/30; B32B 18/00; C04B 2235/3821; C04B 2235/422; C04B 2235/428; C04B 2235/48; C04B 2235/5248; C04B 2235/5256; C04B 2235/5427; C04B 2235/5436; C04B 2235/616; C04B 35/6286; C04B 35/62878; C04B 35/62892; C04B 35/62894; C04B 35/80; C04B 35/83; C04B 2237/361; C04B 2237/385; F16D 2200/0039; F16D 2200/006
See application file for complete search history.

(56) References Cited

U.S. PATENT DOCUMENTS

| | | | |
|---|---|---|---|
| 5,441,762 A | 8/1995 | Gray et al. | |
| 6,110,535 A | 8/2000 | Rey et al. | |
| 6,855,428 B2 | 2/2005 | Lau et al. | |
| 7,378,362 B2 | 5/2008 | Nixon et al. | |
| 8,062,448 B2 * | 11/2011 | Bompard | D04H 3/05 156/441 |
| 8,101,272 B1 * | 1/2012 | Schmidt | C04B 35/573 428/297.4 |
| 10,151,362 B1 | 12/2018 | Bianco et al. | |
| 10,208,412 B2 | 2/2019 | Le Costaouec et al. | |
| 10,294,166 B2 | 5/2019 | McCaffrey et al. | |
| 11,802,089 B2 | 10/2023 | Clerambourg et al. | |
| 2002/0176990 A1 | 11/2002 | Johnson | |
| 2004/0192534 A1 | 9/2004 | Nixon et al. | |
| 2005/0142346 A1 | 6/2005 | Ohnishi et al. | |
| 2005/0153137 A1 | 7/2005 | Thompson et al. | |
| 2012/0258641 A1 | 10/2012 | Bouillon et al. | |
| 2014/0271161 A1 * | 9/2014 | Lazur | C04B 35/62868 428/221 |
| 2016/0332917 A1 | 11/2016 | Hipp et al. | |
| 2021/0094887 A1 | 4/2021 | Poteet et al. | |
| 2021/0238097 A1 | 8/2021 | Khan | |

FOREIGN PATENT DOCUMENTS

| | | |
|---|---|---|
| EP | 1537262 | 7/2016 |
| EP | 3816137 | 5/2021 |
| EP | 3925942 | 12/2021 |
| EP | 3971333 | 3/2022 |
| EP | 4272956 | 11/2023 |
| RU | 2621241 | 6/2017 |
| WO | 2019202235 | 10/2019 |

OTHER PUBLICATIONS

European Patent Office, European Office Action dated Jul. 4, 2023 in Application No. 21179302.1.
USPTO; Requirement for Restriction dated Apr. 6, 2023 in U.S. Appl. No. 17/718,925.
USPTO; Non-Final Office Action dated Sep. 14, 2023 in U.S. Appl. No. 17/718,925.
European Patent Office, European Partial Search Report dated Sep. 13, 2023 in Application No. 23165459.1.
European Patent Office, European Partial Search Report dated Dec. 14, 2023 in Application No. 23165459.1.
European Patent Office, European Partial Search Report dated Jan. 11, 2024 in Application No. 23190400.4.
European Patent Office, European Partial Search Report dated Feb. 8, 2024 in Application No. 17/887,228.
USPTO; Non-Final Office Action dated Mar. 14, 2024 in U.S. Appl. No. 17/718,925.
European Patent Office, European Search Report dated Apr. 4, 2024 in Application No. 23190400.4.

* cited by examiner

COMPOSITES AND METHODS OF FORMING COMPOSITES HAVING AN INCREASED VOLUME OF CERAMIC PARTICLES

CROSS REFERENCE TO RELATED APPLICATIONS

This application claims priority to, and the benefit of, U.S. Provisional Application Ser. No. 63/039,092, filed Jun. 15, 2020 and titled "COMPOSITES AND METHODS OF FORMING COMPOSITES HAVING AN INCREASED VOLUME OF CERAMIC PARTICLES," which is incorporated by reference herein in its entirety for all purposes.

FIELD

The present disclosure relates to composites, and more specifically, to composites having ceramic particles and methods of forming the same.

BACKGROUND

Aircraft typically utilize brake systems on wheels to slow or stop the aircraft during landings, taxiing, and rejected takeoffs. Aircraft brake systems generally employ a brake stack (also referred to as a heat sink) comprising a series of friction disks that may be forced into contact with one another during braking to slow or stop the aircraft. The heat sink typically comprises rotor disks and stator disks that, in response to axial compressive pressure, convert the kinetic energy of the aircraft into heat through frictional forces experienced between the friction disks. Heat sinks comprising carbon fiber carbon matrix composite (C/C) components and/or carbon fiber ceramic matrix composite (CMC) components may prove advantageous in addressing frictional and wear performance.

Next generation heat sinks are expected to exhibit greater heat capacities in order to absorb and dissipate greater amounts of heat, particularly during rejected takeoffs. However, making a C/C and/or CMC component that has the needed strength and the needed specific heat (Cp) has proven difficult. Boron or boron carbide materials possess relatively high heat capacities and thermal stability. However, difficulties arise when attempting to incorporate boron or boron carbide materials into the carbon fiber structures used to form the C/C and CMC components, resulting in limitations on the size and amounts of the high heat capacity materials that may be incorporated into the carbon fiber structures.

SUMMARY

Disclosed herein is a method of fabricating a composite component. In accordance with various embodiments, the method may comprise the steps of forming a fibrous preform and densifying the fibrous preform. The step of forming the fibrous preform may comprise the steps of forming a first ceramic particle layer over a first textile layer, disposing a second textile layer over the first ceramic particle layer, forming a second ceramic particle layer over the second textile layer, and disposing a third textile layer over the second ceramic particle layer.

In various embodiments, the method may further comprise the step of performing a silicon melt infiltration after the densifying the fibrous preform. In various embodiments, the step of forming the first ceramic particle layer may comprise depositing a first volume of boron carbide powder over the first textile layer, and the step of forming the second ceramic particle layer may comprise depositing a second volume of boron carbide powder over the second textile layer.

In various embodiments, the step of forming the fibrous preform may further comprise locating a first shim around an outer perimeter of the first textile layer, and locating a second shim around an outer perimeter of the second textile layer.

In various embodiments, the step of forming the fibrous preform may further comprise removing a portion of the first volume of boron carbide powder extending beyond an upper surface of the first shim, and removing a portion of the second volume of boron carbide powder extending beyond an upper surface of the second shim.

In various embodiments, the step of forming the fibrous preform may further comprise disposing the first textile layer on a first plate, and disposing a second plate over the third textile layer. In various embodiments, at least one of the first plate or the second plate may include at least one of a groove or an orifice. In various embodiments, the method may further comprise the step of applying a compressive load to the fibrous preform.

A method of forming a fibrous preform for fabricating a composite component is also disclosed herein. In accordance with various embodiments, the method may comprise the steps of forming a first ceramic particle layer over a first textile layer, disposing a second textile layer over the first ceramic particle layer, forming a second ceramic particle layer over the second textile layer, and disposing a third textile layer over the second ceramic particle layer.

In various embodiments, the method may further comprise the steps of disposing the first textile layer on a first plate, and disposing a second plate over the third textile layer. At least one of the first plate or the second plate may include at least one of a groove or an orifice.

In various embodiments, the step of forming the first ceramic particle layer may comprise depositing a first volume of boron carbide powder over the first textile layer, and the step of forming the second ceramic particle layer may comprise depositing a second volume of boron carbide powder over the second textile layer.

In various embodiments, the method may further comprise the steps of locating a first shim around an outer perimeter of the first textile layer, and locating a second shim around an outer perimeter of the second textile layer.

In various embodiments, the method may further comprise the steps of selecting the first volume of boron carbide powder such that the first volume of boron carbide powder extends at least to an upper surface of the first shim, and removing any portion of the first volume of boron carbide powder extending beyond the upper surface of the first shim. The upper surface of the first shim may be oriented away from the first plate.

In various embodiments, the method may further comprise the steps of disposing the first textile layer on a mold surface, forming the first ceramic particle layer by depositing a mixture of boron carbide powder and phenolic resin powder over the first textile layer, and curing the phenolic resin powder.

In various embodiments, at least one of the first textile layer, the second textile layer, or the third textile layer may comprise stretch-broken carbon fibers.

A fiber reinforced composite component is also disclosed herein. In accordance with various embodiments, the fiber reinforced composite component may comprise a first textile layer comprising a plurality of first carbon fibers, a second textile layer comprising a plurality of second carbon fibers and a layer of ceramic particles located between the first textile layer and the second textile layer. A carbon matrix material may encapsulate the plurality of first carbon fibers, the plurality of second carbon fibers, and the layer of ceramic particles. The carbon matrix material may define a plurality of pores. A silicon material may be located in the plurality of pores.

In various embodiments, the ceramic particles may comprise boron carbide. In various embodiments, a ratio of a weight of the boron carbide to a weight of the silicon material may be greater than or equal to 2.125:1.

In various embodiments, a weight percentage of the silicon material may be less than 6.0% of a total weight of the fiber reinforced composite component. In various embodiments, a weight percentage of the boron carbide may be between 20% and 60% of the total weight of the fiber reinforced composite component.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
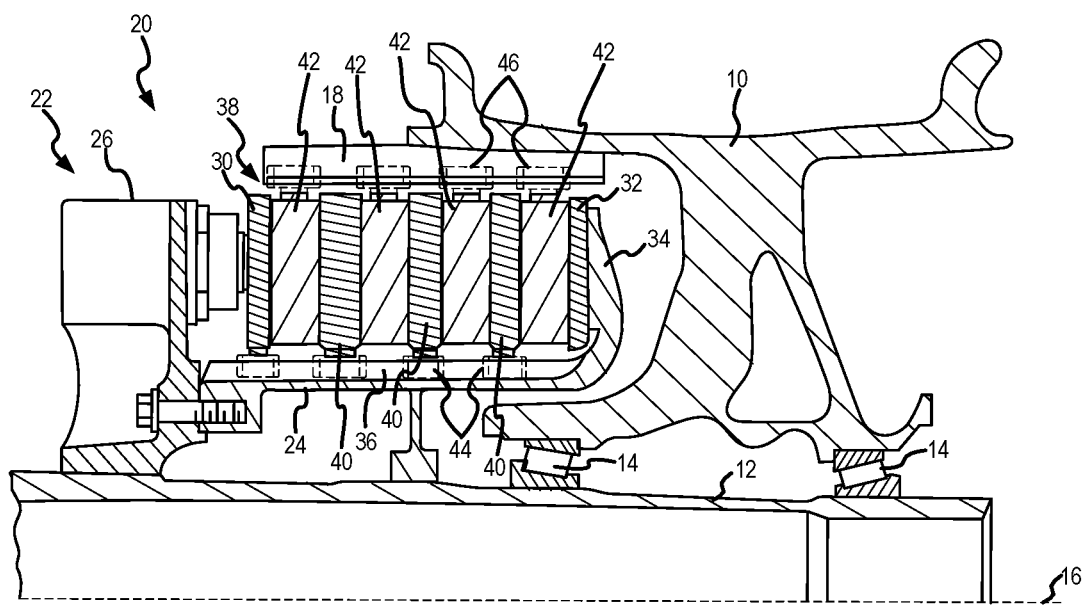
FIG. 1 illustrates a multi-disk brake assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Provided herein, according to various embodiments, are fiber reinforced composite parts and method(s) for fabricating fiber reinforced composite parts, such as brake disks, having ceramic particle layers interspersed between textile layers. While numerous details are included herein pertaining to aircraft components, such as brake components, the components and method(s) disclosed herein can be applied to fabricate other carbon fiber-reinforced/carbon matrix composite (C/C) components that benefit from better wear performance and increased specific heat (Cp).

With reference to FIG. 1, a multi-disk brake assembly 20 is illustrated, in accordance with various embodiments. Multi-disk brake assembly 20 is mounted on an axle 12 for use with a wheel 10 disposed on and configured to rotate about the axle 12 via one or more bearing assemblies 14. A central axis 16 extends through the axle 12 and defines a center of rotation of the wheel 10. A torque tube 24 (sometimes referred to as a torque plate barrel or a torque plate) is aligned concentrically with the central axis 16. Wheel 10 is rotatable relative to the torque tube 24. Torque tube 24 includes a series of axially extending stator splines 36 (one shown). Wheel 10 includes a series of axially extending rotor splines 18 (one shown). Rotation of wheel 10 is modulated by multi-disk brake assembly 20.

Multi-disk brake assembly 20 includes a plurality of brake disks 38. The plurality of brake disks 38 includes at least one non-rotatable friction disk (stator disk) 40, and at least one rotatable friction disk (rotor disk) 42. Each of the brake disks 38 includes an attachment structure. In various embodiments, each of the stator disks 40 includes a plurality of stator lugs 44 at circumferentially spaced positions around an inner circumference of the stator disk 40 as an attachment structure. Similarly, each of the rotatable rotor disks 42 includes a plurality of rotor lugs 46 at circumferentially spaced positions around an outer circumference of the rotor disk 42.

Brake disks 38 may include an end plate 32 and a pressure plate 30 located on opposing axial ends of the brake disk stack. End plate 32 is connected to, or is otherwise frictionally engaged with, a reaction plate 34 of torque tube 24. End plate 32 is non-rotatable by virtue of its connection to torque tube 24. Stator splines 36 may support pressure plate 30 such that pressure plate 30 is also non-rotatable. Stator splines 36 may also support non-rotatable stator disks 40. Stator disks 40 may engage stator splines 36 with gaps formed between stator lugs 44. Similarly, rotor disks 42 may engage rotor splines 18 with gaps formed between rotor lugs 46. Rotor disks 42 may be rotatable by virtue of their engagement with rotor splines 18 of wheel 10.

An actuating mechanism for the multi-disk brake assembly 20 includes a plurality of piston assemblies 22 (one shown) circumferentially spaced around a piston housing 26. Upon actuation, the plurality of piston assemblies affects a braking action by urging pressure plate 30, stator disks 40, and end plate 32 into frictional engagement with rotor disks 42. Through compression of the plurality of rotor disks 42 and the plurality of stator disks 40 between the pressure plate 30 and the end plate 32, the resulting frictional contact slows or stops or otherwise prevents rotation of the wheel 10.

In various embodiments, one or more of the friction disks (e.g., rotor disks 42, stator disks 40, pressure plate 30, end plate 32) are fabricated from composite materials, such as, for example, C/C and/or CMC, that enable the brake disks to withstand and dissipate the heat generated during and following a braking action. In various embodiments, the non-rotating frictional components of multi-disk brake assembly 20 (i.e., pressure plate 30, end plate 32, and stator disks 40) may comprise a material that is different from the material of the rotating frictional component (e.g., rotor disks 42). For example, in various embodiments, rotor disks 42 comprise C/C and pressure plate 30, end plate 32, and/or stator disks 40 may comprise CMC. In various embodiments, rotor disks 42 and/or stator disks 40 may comprise a core made of a first material (e.g., CMC) and wear liners attached to the core that are made of a second, different material (e.g., C/C).

In accordance with various embodiments, one or more of the friction disks are comprised of a C/C material having high specific heat particles interspersed throughout the friction disk, where high specific heat particles includes any particle or powder (typically ceramic) that raises the specific heat of the disk above that of C/C alone. For example, in various embodiments, the friction disk may comprise a C/C that includes a percentage of boron, boron carbide ($B_4C$), a boron component, or other material having a high specific heat (i.e., a specific heat greater than the specific heat of the C/C alone).

As described in further detail below, the process of interspersing the boron carbide (or other high specific heat particles) into the C/C is performed by depositing a boron carbide powder between one or more textile layers of the fibrous preform used to form the friction disk. After forming the fibrous preform, including one or more layers of boron carbide particles, the fibrous preform is densified using chemical vapor infiltration (CVI) and/or chemical vapor deposition (CVD). During densification, a matrix material (e.g., a carbon matrix) is deposited on and encapsulates the boron carbide particles and the fibers of the textile layers. In various embodiments, after densification, a silicon melt infiltration is performed to form a silicon layer over the carbon matrix. Depositing boron carbide powder between the textile layers may allow greater volumes of boron carbide ($B_4C$) to be included in the composite part. Increasing the volume of boron carbide may decrease a porosity and/or increase a density of the final composite component. Further, greater volumes of $B_4C$ particles may reduce the volume of silicon material in the final composite component and/or may increase the specific heat of the final composite component.

Figure 2:
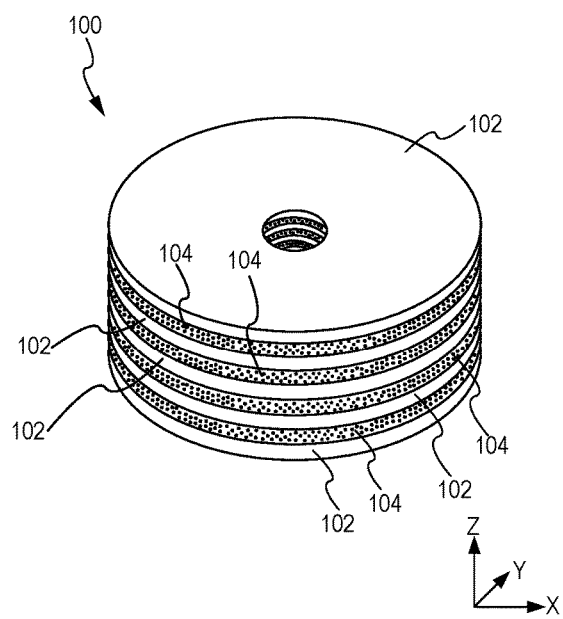
FIG. 2 illustrates a fibrous preform including ceramic particle layers interspersed between textile layers, in accordance with various embodiments.

Referring now to FIG. 2, a fibrous preform 100 is illustrated, in accordance with various embodiments. Fibrous preform 100 may be employed to form a friction disk, as described above. Fibrous preform 100 may comprise a plurality of stacked textile layers 102. Each textile layer 102 has a first dimension in the axial direction (e.g., as measured along the direction of the Z-axis) that may be substantially less than the dimensions of the textile layer 102 in the radial and circumferential directions (e.g., as measured along directions of the X-axis and Y-axis).

In accordance with various embodiments, textile layers 102 comprises woven, braided, or knitted carbon fibers. In various embodiments, one or more of the textile layers 102 may comprise carbon fibers in an open weave pattern (i.e., a weave wherein there is increased distance between the warp tows and between the weft tows). In various embodiments, one or more of the textile layers 102 may comprise stretch-broken carbon fibers. Employing stretch-broken carbon fibers tends to increase the bonding or securing of ceramic particles (e.g., $B_4C$) within the textile layer and the composite part. In various embodiments, the carbon fibers may be derived from polyacrylonitrile (PAN), rayon (synthetic fiber derived from cellulose), oxidized polyacrylonitrile fiber (OPF), carbon pitch, or the like. The starting fiber may be pre-oxidized PAN or fully carbonized commercial carbon fiber. The textile layers 102 may be formed or cut having any desired shape or form. For example, the textile layers 102 may have any shape such as, for example, a polygon, circular, triangle, square, rectangle, pentagon, hexagon, octagon, or any other desired shape. In various embodiments, textile layers 102 and fibrous preform 100 may have a generally annular shape.

Fibrous preform 100 is a lay-up of textile layers 102. In accordance with various embodiments, fibrous preform 100 includes one or more ceramic particle layers 104. Each ceramic particle layer 104 is located between a pair of adjacent textile layers 102. In various embodiments, ceramic particle layers 104 may be comprised of boron carbide particles. A range of particle sizes (or powder sizes) may be employed in the ceramic powders used to fabricate the ceramic particle layers 104. For example, in various embodiments, a boron carbide powder between 10 grit and 400 grit may be selected for ceramic particle layers 104. In various embodiments, a boron carbide powder between 100 grit and 400 grit may be selected for ceramic particle layers 104. In various embodiments, a boron carbide powder between 100 grit and 320 grit may be selected for ceramic particle layers 104. In various embodiments, a 240 grit boron carbide powder may be used to form ceramic particle layers 104. Stated differently, the boron carbide particles may have an average particle size between about 22 micrometers (μm) and about 1854 μm, between about 22 μm and about 122 μm, between about 31 μm and about 122 μm, and/or about 51 μm (i.e., between about 0.00047 inches and about 0.073 inches, between about 0.00047 inches and about 0.0048 inches, between about 0.00122 inches and about 0.0048 inches, and/or about 0.0020 inches). As used in the previous context only, the term "about" means plus or minus ten percent of the associated value.

Figure 3:
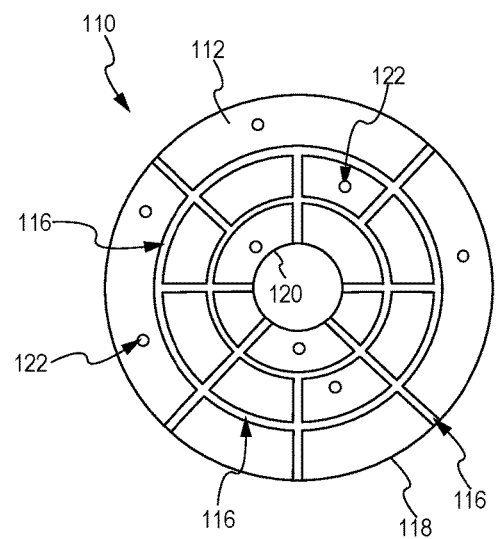
FIG. 3 illustrates a plate for facilitating formation and densification of a fibrous preform having ceramic particle layers interspersed between textile layers, in accordance with various embodiments.
Figure 4A:
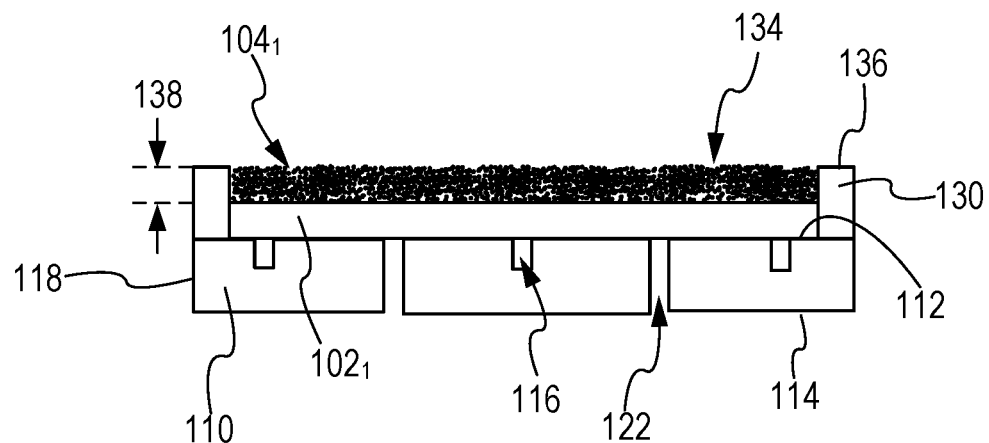
FIGS. 4A, 4B and 4C illustrate formation of a fibrous preform including ceramic particle layers, in accordance with various embodiments.
Figure 4B:
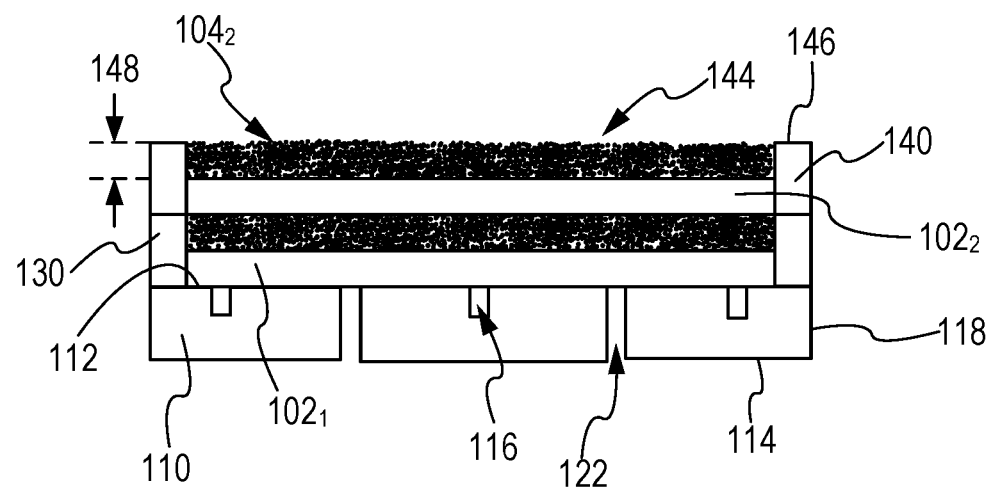
Figure 4C:
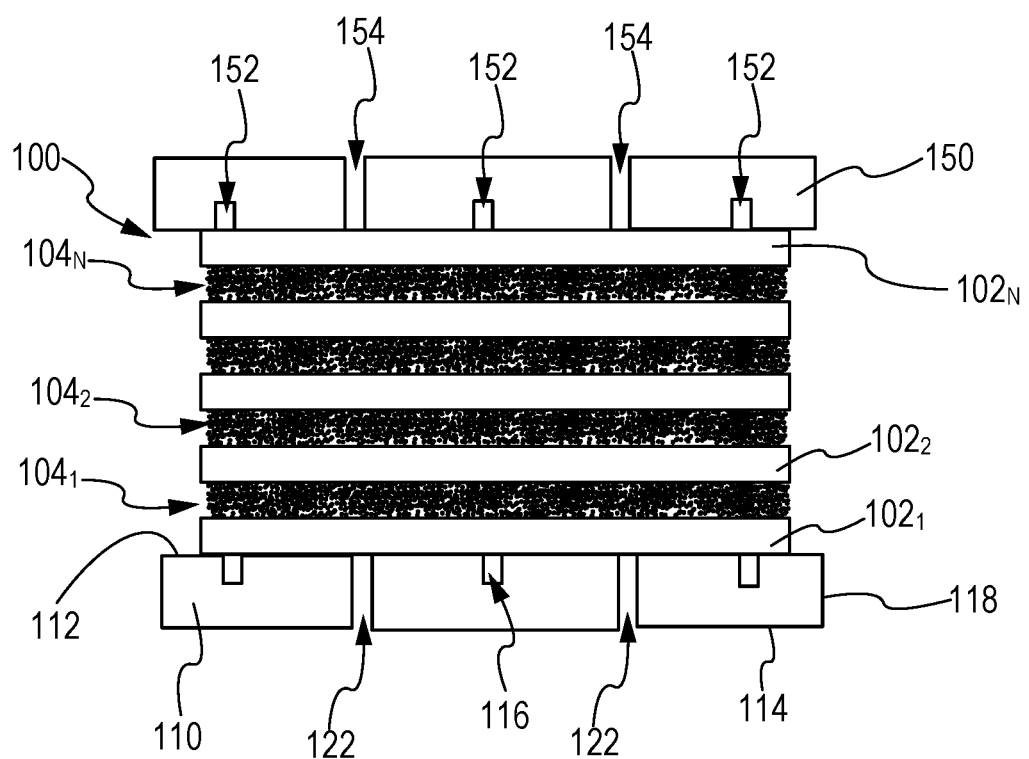

With reference to FIGS. 4A, 4B, and 4C, formation of fibrous preform 100 is illustrated, in accordance with various embodiments. In FIG. 4A, a first textile layer $102_1$ is located on a plate 110. FIG. 3 illustrates plate 110. With combined reference to FIGS. 3 and 4A, plate 110 includes opposing surfaces 112 and 114. First textile layer $102_1$ may be located on surface 112 of plate 110. A plurality of grooves, or channels, 116 may be formed into surface 112. Stated differently, surface 112 of plate 110 may define grooves 116. Grooves 116 may extend from an outer circumferential surface 118 and/or from an inner circumferential surface 120 of plate 110. In various embodiments, plate may include one or more orifices 122 extend from surface 112 to surface 114. Grooves 116 and orifices 122 tend to facilitate the flow gas to and infiltration of the fibrous preform during densification. Grooves 116 and orifices 122 may be formed in any desired pattern. While plate 110 is illustrated as having an annular shape, it is contemplated and understood that plate 110 may have any desired shape. In various embodiments, the shape of plate 110 matches the shape of textile layers 102.

With continued reference to FIG. 4A, a first shim, or spacer, 130 is located around an outer perimeter (or outer circumference) 132 of first textile layer $102_1$. For textile layers having an annular shape, a shim is also located along the inner perimeter (or inner circumference). With first shim 130 in place, boron carbide powder 134 is deposited (e.g., poured) over first textile layer $102_1$. The boron carbide powder 134 is deposited until, at least, an upper surface 136 of first shim 130 is reached (i.e., until the volume defined by first shim 130 and first textile layer 102₁ is filled, or substantially filled, with boron carbide powder 134). In various embodiments, a scrapper or leveler may be translated (i.e., slid) over boron carbide powder 134 and first shim 130 to remove any portion of boron carbide powder 134 which may be extending beyond upper surface 136 of first shim 130. In this regard, after scraping, the boron carbide powder 134 forms a first ceramic particle layer $104_1$ having a thickness 138.

With reference to FIG. 4B, a second textile layer $102_2$ is located over first ceramic particle layer $104_1$. A second shim 140 is located over first shim 130 and around the outer perimeter of second textile layer $102_2$. For textile layers having an annular shape, a shim is also located along the inner perimeter (or inner circumference). With second shim 140 in place, boron carbide powder 144 is deposited (e.g., poured) over second textile layer $102_2$. The boron carbide powder 144 deposited until at least an upper surface 146 of second shim 140 is reached (i.e., until the volume defined by second shim 140 and second textile layer $102_2$ is filled, or substantially filled, with boron carbide powder 144). In various embodiments, a scrapper or leveler may be translated or slid over boron carbide powder 144 and second shim 140 to remove any portion of boron carbide powder 144 which may be extending beyond upper surface 146 of second shim 140. In this regard, after scraping, the boron carbide powder 144 forms a second ceramic particle layer $104_2$ having a thickness 148. Thickness 148 may be equal to thickness 138 (FIG. 4A).

With reference to FIG. 4C, once the desired number of textile layers 102 and ceramic particle layers 104 have been formed (i.e., stacked), the shims are removed and a plate 150 is located over the final textile layer $102_N$. In this regard, plate 110 and plate 150 are located over opposing ends of fibrous preform 100. Plate 150 may include grooves 152 and/or orifices 154, similar to grooves 116 and orifices 122 in plate 110.

In accordance with various embodiments, a compressive load may be applied to fibrous preform 100. For example, in response to removing the shims, the weight of plate 150 may compress fibrous preform 100 between plate 110 and plate 150. In various embodiments, a compressive load may be applied to plate 150 to compress fibrous preform 100 between plate 110 and plate 150. In various embodiments, one or more clamps may be attached between plate 110 and plate 150. The clamps are configured to compress fibrous preform 100 between plate 110 and plate 150.

Fibrous preform 100 and plates 110, 150 are then placed in a CVI/CVD furnace for densification. After densification (i.e., once a desired density and/or a desired volume of carbon matrix is achieved), a silicon melt infiltration (SMI) may be performed to fill, or substantially fill, any remaining porosity (e.g., any pores in and/or defined by the matrix material).

In various embodiments, fibrous preform 100 may be fabricated using a net shape molding technology. For example, the textile layers 102 and ceramic particle layers 104 may be laid-up over a mold surface, rather than plate 110. During the lay-up process, the textile layers 102 of fibrous preform 100 conform to the shape of the mold surface. In various embodiments, the ceramic particle layers 104 may include a mixture of boron carbide powder and phenolic resin powder. The phenolic resin powder may form, for example, between 5% and 10%, between 0.5% and 5%, or less than 2%, by weight percentage, of the total boron-carbide-phenolic-resin powder mixture. Once the desired number of textile layers 102 and ceramic particle layers 104 have been stacked over the mold surface, the fibrous preform is cured. For example, the fibrous preform may be heated at a temperature of about 200° C. for between 1 and 10 hours. It will be appreciated that the cure temperature and time may be selected based on the particular type and volume of phenolic resin powder. Fabricating the fibrous preform using net shape molding technology may decrease manufacturing time and/or material waste, as the need to machine the part may be eliminated or reduced. After curing, the fibrous preform 100 is densified and a SMI is performed.

Figure 5A:
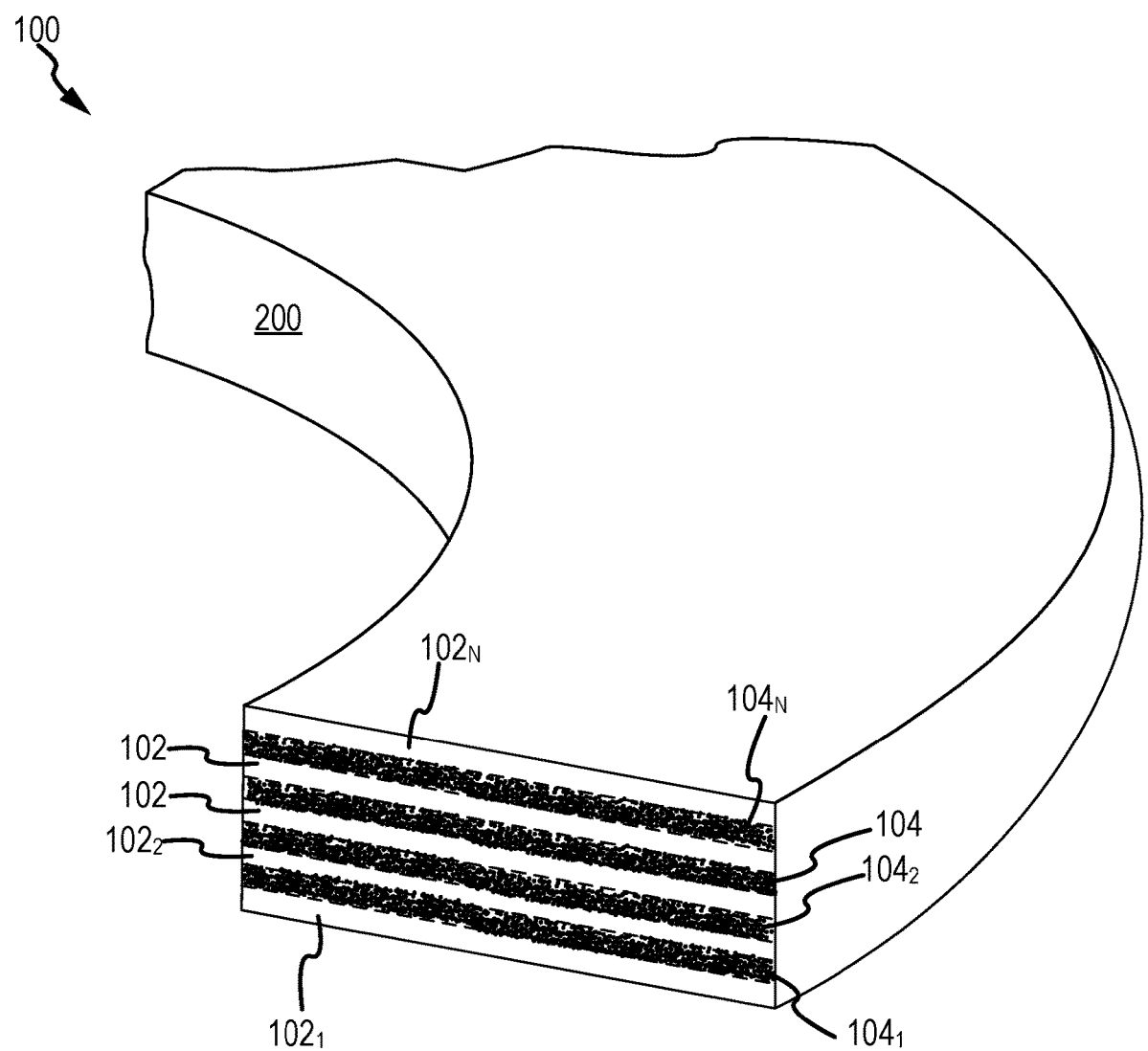
FIG. 5A illustrates a cross-section view of a fibrous preform after densification and silicon melt infiltration, in accordance with various embodiments.

FIG. 5A shows a cross-section view of fibrous preform 100 after densification and SMI. After densification and SMI, fibrous preform 100 forms a fiber-reinforced composite component 200. Stated differently, the densified and silicon infiltrated fibrous preform is a fiber-reinforced composite component. The porosity, or open space, between the carbon fibers of textile layers 102 and between the boron carbide particles of ceramic particle layers 104 is filled or substantially filled with carbon matrix 202. It is contemplated and understood that boron carbide particles may infiltrate and be located within the textile layers 102.

Figure 5B:
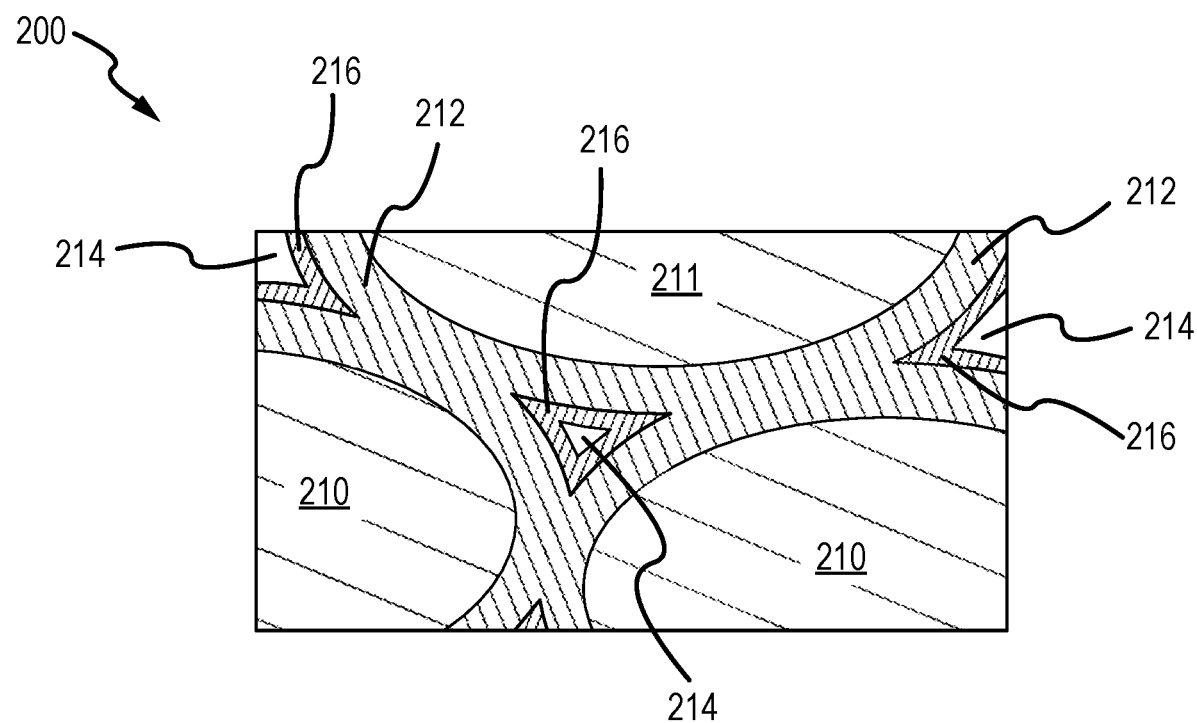
FIG. 5B illustrates a magnified view of a portion of the fibrous preform of FIG. 5A, in accordance with various embodiments.

With reference to FIG. 5B, a magnified view of a portion of fiber-reinforced composite component 200 (i.e., fibrous preform 100 after densification and SMI) is illustrated. Boron carbide particles 210 and carbon fibers 211 are coated and/or encapsulated with matrix material (e.g., carbon) 212. Stated differently, matrix material 212 is located in the porosity (i.e., open volume) between adjacent boron carbide particles 210, between adjacent carbon fibers 211, and between adjacent boron carbide particles 210 and carbon fibers 211. During SMI, silicon 214 infiltrates the porosity (i.e., open volume) in the matrix material 212. A layer of silicon carbide 216 may be formed at the interface between the silicon 214 and the carbon of matrix material 212. The silicon 214 and silicon carbide 216 coating over the matrix material 212 and the boron carbide particles 210 tends to protect the boron carbide from moisture, which reduces the risk of boron trioxide ($B_2O_3$) formation, at increased temperatures, and/or subsequent boric acid formation. Decreasing boron trioxide ($B_2O_3$) and/or boric acid formation tends to reduce the material loss and/or the material recession associated with increased volumes of boron carbide.

In various embodiments, after densification and prior to SMI, fibrous preform 100 may have an open porosity of less than 15%, less than 10%, or less than 8%. In the regard, the open volume defined by the matrix material 212 may form less than 15%, less than 10%, or less than 8% of the total volume of densified fibrous preform 100. In various embodiments, after SMI, fiber-reinforced composite component 200 may have an open porosity of less than 2% or less than 1%. In this regard, the pores, or open volume, of fiber-reinforced composite component 200 may form less than 2% or less than 1% of the total volume of fiber-reinforced composite component 200. In various embodiments, the silicon material (e.g., the silicon 214 and the silicon in the silicon carbide 216) may form less than 10%, less than 8%, or less than 6% of a total mass of fiber-reinforced composite component 200.

In accordance with various embodiments, the volume of boron carbide powder in fiber-reinforced composite component 200 is selected such that a ratio of the mass of boron carbide to the mass of silicon in fiber-reinforced composite component 200 is at least 2.125:1. In various embodiments, the ratio of the mass of boron carbide to the mass silicon in fiber-reinforced composite component 200 may be between 2.125:1 and 15:1, between 2.125:1 and 5:1, between 2.125:1 and 3:1, or between 2.125:1 and 2.5:1. A ratio of 2.125:1 or greater is associated with an increased specific heat of fiber-reinforced composite component 200, relative to C/C alone. Increasing the ratio of boron carbide to silicon in fiber-reinforced composite component 200 tends to increase the specific heat of fiber-reinforced composite component 200. In this regard, the specific heat of fiber-reinforced composite component 200 may be tailored by increasing the volume boron carbide and/or decreasing the volume of silicon. In various embodiments, fiber-reinforced composite component 200 may include, by weight percentage, between 10% and 80% boron carbide, between 20% and 60% boron carbide, and/or between 50% and 60% boron carbide. Fiber-reinforced composite component 200 may thus be a exhibits similar properties (e.g., strength, ductility, reduced crack propagation, etc.) to C/C alone, but with an increased specific heat. Stated differently, fiber-reinforced composite component 200 is a CMC material having a greater specific heat than C/C, while exhibiting the other properties of C/C.

Figure 6A:
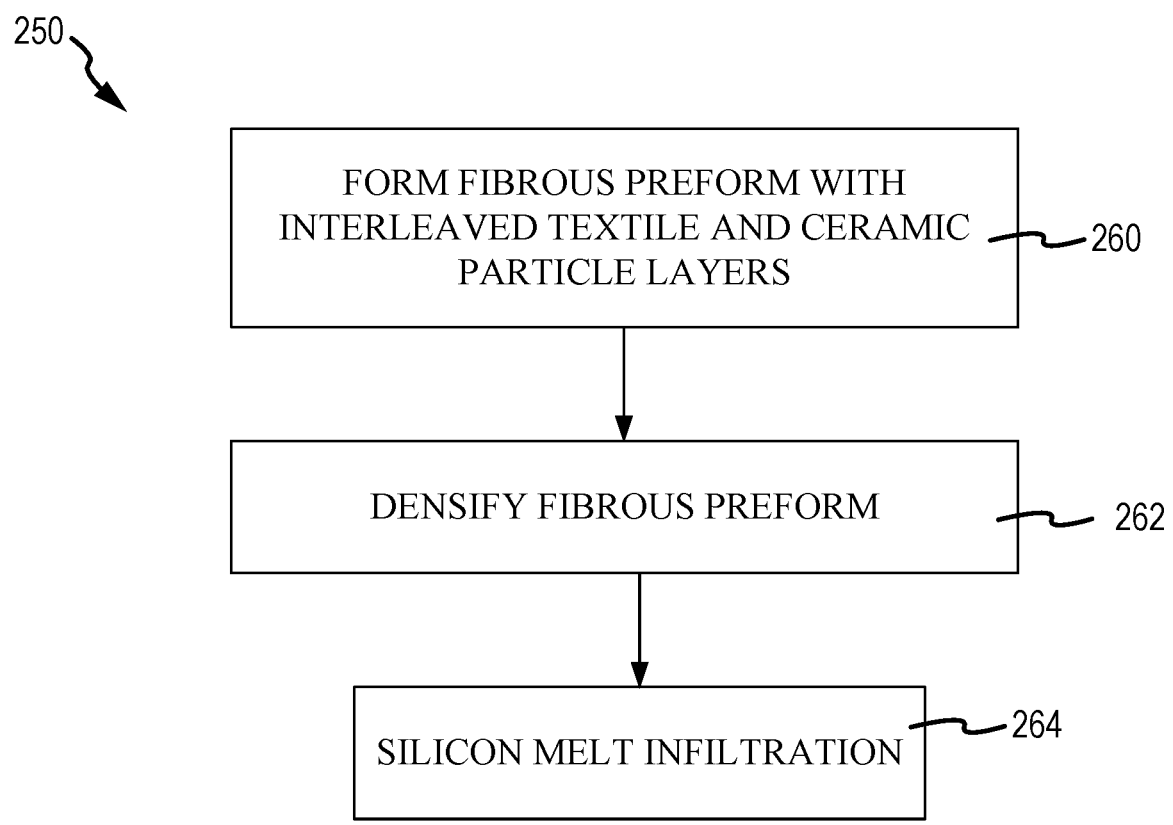
FIGS. 6A, 6B, and 6C illustrate a method of forming a fibrous preform and a composite component, in accordance with various embodiments.

With reference to FIG. 6A, a method 250 of fabricating a composite component is illustrated. In accordance with various embodiments, method 250 may include forming a fibrous preform (step 260), densifying the fibrous preform (step 262), and performing a silicon melt infiltration (step 264).

Figure 6B:
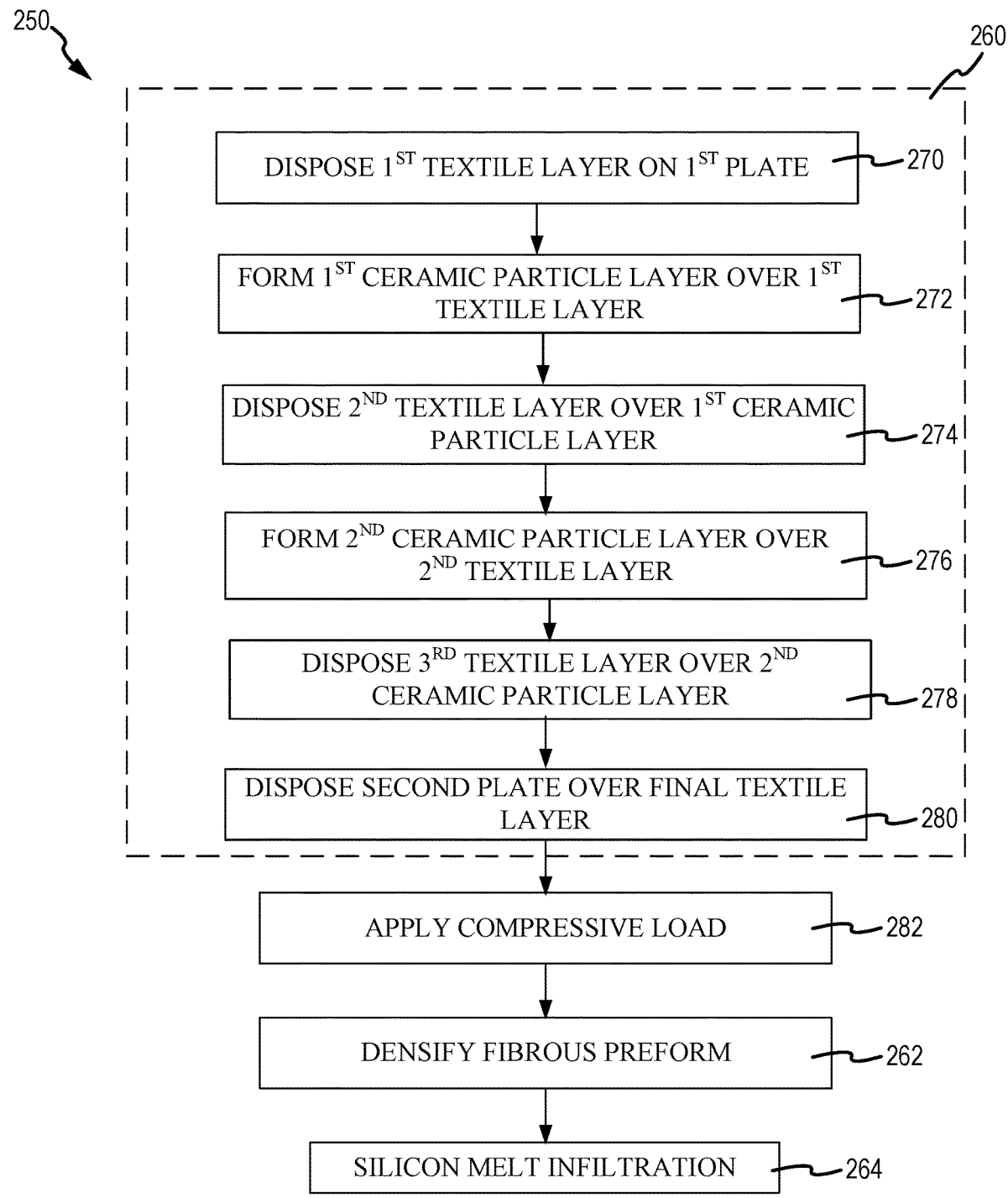

With reference to FIG. 6B, step 260 of method 250 may include disposing a first textile layer on first plate (step 270), forming a first ceramic particle layer over a first textile layer (step 272) disposing a second textile layer over the first ceramic particle layer (step 274), forming a second ceramic particle layer over the second textile layer (step 276), and disposing a third textile layer over the second ceramic particle layer (step 278). Once a desired number of textile layers and ceramic particle layers have been stacked, a second plate is located over the final textile layer (step 280). In various embodiments, a compressive load may be applied to the fibrous preform (step 282). In various embodiments, the compressive load may be applied during the densification step (i.e., step 262).

Figure 6C:
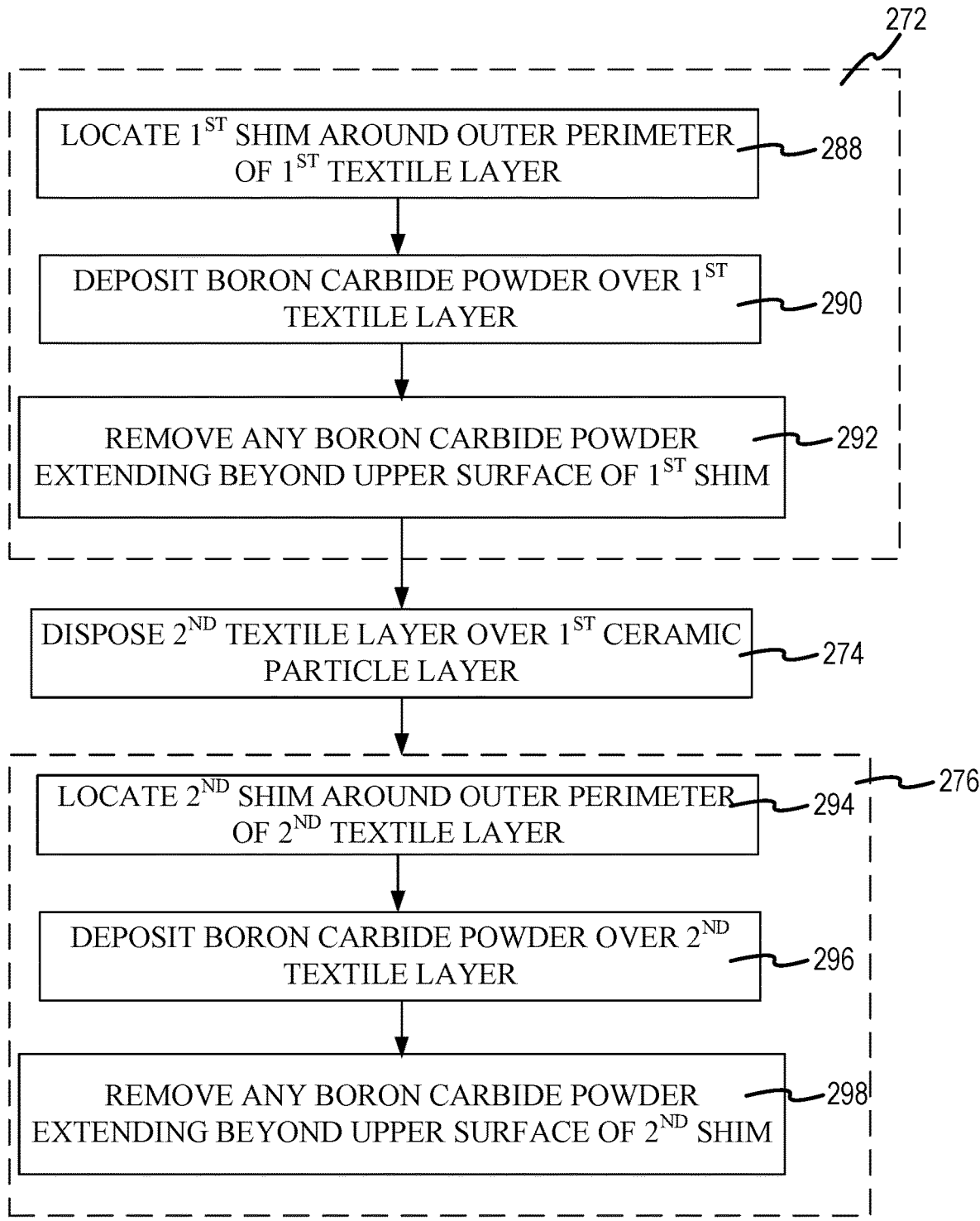

With reference to FIG. 6C, in various embodiments, step 272 includes locating a first shim around an outer perimeter of the first textile layer (step 288), depositing a boron carbide powder over the first textile layer (step 290), and removing any portion of the boron carbide powder that extends above an upper surface of the first shim (step 292). In various embodiments, step 276 includes locating a second shim around an outer perimeter of the second textile layer (step 294), depositing a boron carbide powder over the second textile layer (step 296), and removing any portion of the boron carbide powder that extends above an upper surface of the second shim (step 298).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A method of fabricating a fiber-reinforced composite component, comprising:
forming a fibrous preform by:
disposing a first stretch-broken carbon fiber textile layer on a plate;
forming a first ceramic particle layer over the first stretch-broken carbon fiber textile layer, wherein forming the first ceramic particle layer comprises depositing a first volume of boron carbide powder over the first stretch-broken carbon fiber textile layer;
disposing a second stretch-broken carbon fiber textile layer over the first ceramic particle layer;
forming a second ceramic particle layer over the second stretch-broken carbon fiber textile layer, wherein forming the second ceramic particle layer comprises depositing a second volume of boron carbide powder over the second stretch-broken carbon fiber textile layer; and
disposing a third stretch-broken carbon fiber textile layer over the second ceramic particle layer;
densifying the fibrous preform, and
performing a silicon melt infiltration after the densifying the fibrous preform, wherein the silicon melt infiltration substantially fills a porosity between carbon fibers of the first stretch-broken carbon fiber textile layer, the second stretch-broken carbon fiber textile layer, the third stretch-broken carbon fiber textile layer, and boron carbide particles of the first and second volumes of boron carbide powder with silicon and silicon carbide to form the fiber-reinforced composite component.

2. The method of claim 1, wherein forming the fibrous preform further comprises:
locating a first shim around an outer perimeter of the first stretch-broken carbon fiber textile layer; and
locating a second shim around an outer perimeter of the second stretch-broken carbon fiber textile layer.

3. The method claim 2, wherein forming the fibrous preform further comprises:
removing a portion of the first volume of boron carbide powder extending beyond an upper surface of the first shim; and
removing a portion of the second volume of boron carbide powder extending beyond an upper surface of the second shim.

4. The method of claim 1, wherein the plate is a first plate and wherein forming the fibrous preform further comprises:
disposing a second plate over the third stretch-broken carbon fiber textile layer.

5. The method of claim 4, wherein at least one of the first plate or the second plate includes at least one of a groove or an orifice.

6. The method of claim 5, further comprising applying a compressive load to the fibrous preform.

7. A method of forming a fibrous preform for fabricating a composite component, comprising:
disposing a first stretch-broken carbon fiber textile layer on a plate;
forming a first ceramic particle layer over a first stretch-broken carbon fiber textile layer, wherein forming the first ceramic particle layer comprises depositing a first volume of boron carbide powder over the first stretch-broken carbon fiber textile layer;
disposing a second stretch-broken carbon fiber textile layer over the first ceramic particle layer;
forming a second ceramic particle layer over the second stretch-broken carbon fiber textile layer;
disposing a third stretch-broken carbon fiber textile layer over the second ceramic particle layer;
densifying the fibrous preform, and
performing a silicon melt infiltration after the densifying the fibrous preform, wherein the silicon melt infiltration substantially fills a porosity between carbon fibers of the first stretch-broken carbon fiber textile layer, the second stretch-broken carbon fiber textile layer, the third stretch-broken carbon fiber textile layer, and boron carbide particles of the first and second volumes of boron carbide powder with silicon and silicon carbide to form the fiber-reinforced composite component.

8. The method of claim 7, wherein the plate is a first plate and wherein the method further comprises:
disposing a second plate over the third textile layer, wherein at least one of the first plate or the second plate includes at least one of a groove or an orifice.

9. The method of claim 7, further comprising:
locating a first shim around an outer perimeter of the first stretch-broken carbon fiber textile layer; and
locating a second shim around an outer perimeter of the second stretch-broken carbon fiber textile layer.

10. The method of claim 9, further comprising:
selecting the first volume of boron carbide powder such that the first volume of boron carbide powder extends at least to an upper surface of the first shim; and
removing any portion of the first volume of boron carbide powder extending beyond the upper surface of the first shim, the upper surface of the first shim being oriented away from the first plate.

11. The method of claim 7, further comprising:
disposing the first stretch-broken carbon fiber textile layer on a mold surface;
forming the first ceramic particle layer by depositing a mixture of boron carbide powder and phenolic resin powder over the first stretch-broken carbon fiber textile layer; and
curing the phenolic resin powder.

* * * * *